United States Patent
Dinges et al.

(10) Patent No.: US 7,370,084 B2
(45) Date of Patent: May 6, 2008

(54) METHOD FOR STORING DATA IN A MEMORY IN A DISTRIBUTED AUTOMATION SYSTEM AND METHOD FOR COUPLING AN AUTOMATION COMPONENT TO A DISTRIBUTED AUTOMATION SYSTEM

(75) Inventors: Clemens Dinges, Obermichelbach (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 614 days.

(21) Appl. No.: 10/432,783

(22) PCT Filed: Sep. 17, 2002

(86) PCT No.: PCT/EP02/10442

§ 371 (c)(1),
(2), (4) Date: May 27, 2003

(87) PCT Pub. No.: WO03/029906

PCT Pub. Date: Apr. 10, 2003

(65) Prior Publication Data

US 2004/0027875 A1 Feb. 12, 2004

(30) Foreign Application Priority Data

Sep. 27, 2001 (EP) .................................. 01123168

(51) Int. Cl.
*G06F 13/16* (2006.01)

(52) U.S. Cl. .................. 709/214; 709/213; 709/203; 711/148; 711/147

(58) Field of Classification Search .................... 710/2, 710/8, 10, 16, 300, 304, 104; 709/220, 221, 709/222, 226; 718/104; 719/321, 327; 711/1, 711/2, 170; 713/2
See application file for complete search history.

(56) References Cited

U.S. PATENT DOCUMENTS

| 4,694,396 | A | | 9/1987 | Weisshaar et al. |
| 5,025,365 | A | * | 6/1991 | Mathur et al. ............... 711/121 |
| 5,872,956 | A | * | 2/1999 | Beal et al. .................. 709/224 |
| 5,940,856 | A | * | 8/1999 | Arimilli et al. ............. 711/119 |
| 5,974,474 | A | * | 10/1999 | Furner et al. .................. 710/8 |
| 6,205,362 | B1 | | 3/2001 | Eidson |
| 6,209,089 | B1 | * | 3/2001 | Selitrennikoff et al. ......... 713/2 |
| 6,513,115 | B2 | * | 1/2003 | Nock et al. .................. 713/100 |
| 2003/0142111 | A1 | * | 7/2003 | Emerson et al. ............ 345/600 |

FOREIGN PATENT DOCUMENTS

DE 19624929 A1 * 1/1998
WO WO 9857239 A1 * 12/1998

* cited by examiner

*Primary Examiner*—B. James Peikari
(74) *Attorney, Agent, or Firm*—Staas & Halsey LLP

(57) ABSTRACT

Dynamic access is provided to automation resources, where, in a distributed automation system having a plurality of automation components, a first automation component searching for an automation resource sends a request to the automation system and, for this request, receives a response regarding availability of suitable automation resources from all automation components which it has been possible to reach, and then selects that automation component which has the suitable automation resource and uses the automation resource.

10 Claims, 3 Drawing Sheets

METHOD FOR STORING DATA IN A MEMORY IN A DISTRIBUTED AUTOMATION SYSTEM AND METHOD FOR COUPLING AN AUTOMATION COMPONENT TO A DISTRIBUTED AUTOMATION SYSTEM

CROSS REFERENCE TO RELATED APPLICATIONS

This application is based on and hereby claims priority to PCT Application No. PCT/EP02/10442 filed on Sep. 17, 2002 and European Application No. EP 011 23 168.5 filed on Sep. 27, 2001, the contents of which are hereby incorporated by reference.

BACKGROUND OF THE INVENTION

The invention relates to a method for storing, retrieving and assigning data in a distributed automation system and hence, more generally, to a method for dynamic access to automation resources, since a memory or a data record stored in the memory is also included under the generic term automation resource below.

A distributed automation system is subsequently to be understood to mean an automation system having a plurality of automation components, each automation component being communicatively connected to at least one other automation component. In this way, each automation component can be reached either indirectly or directly by any other automation component. The connection between the automation components is made via a field bus, for example. It is likewise conceivable for some or all of the automation components to be connected to the Internet or to a local derivative of the Internet.

To date, even in a distributed automation system, data have always been stored in a memory which is associated with the respective automation component, to which the data to be stored are supplied, by an explicit association, e.g. a "hardware configuration". Normally, a memory provided locally on the respective automation component is used for storage in this context.

Similarly, a central data server which, for the purpose of central data storage, is associated with all the automation components involved in an automation system is known.

Selection of the storage location during the routine on the basis of prescribed or prescribable criteria, such as the obtainability of the memory, its speed, the security of the stored data, etc., is currently not known.

SUMMARY OF THE INVENTION

One possible object of the invention is to specify a method for dynamic access to automation resources, i.e. access which varies in relation to particular prescribable or prescribed parameters.

Accordingly, to store data in a memory in a distributed automation system having a plurality of automation components, the data initially being stored locally on an automation component, a client, the following steps are carried out:

First, the client sends a request to the automation system. Sending a request to the automation system may cause the request to be forwarded successively from an automation component to every other automation component directly connected to it. The client thus initially sends a request to every automation component directly connected to it.

Every automation component reached in this manner then forwards the request to every automation component directly connected to it. Every automation component reached in this manner proceeds in the same way until either all the automation components in the automation system have been reached or the request's runtime exceeds a prescribed or prescribable threshold value.

Next, every automation component which has received the request sends the client a response containing detailed information relating to the memory to which the respective automation component has access. In this context, an automation component has access to at least one memory locally associated with it. The detailed information comprises, by way of example, information about the type and size of the memory, e.g. an indication of the memory size in Kbytes, an indication of the type of memory, e.g. whether it is a volatile memory or a nonvolatile memory. In addition, one important piece of detailed information can comprise information about the availability of the memory, e.g. whether the memory is permanently available in the automation system or only temporarily, or about the data transfer speed at which data can be written to the memory or at which data can be fetched from the memory. Another important additional or alternative piece of detailed information comprises information about the security of the stored data in the respective memory, e.g. whether the data are protected using simple parity information, a data protection code, e.g. in the form of a CRC signature or the like, or whether the memory is in redundant form or the like, for example.

Finally, the client uses this or similar detailed information to select a memory and sends the data to be stored to the appropriate automation component, which enters the data received into the selected memory using its ability to access the selected memory. It is also conceivable for the client to send the data directly to the memory. However, this generally requires that the memory be directly addressable in the automation system, so that in an abstraction stage in which the automation system is in the form of a collection of automation components, this directly available memory is also an automation component whose only functionality in the automation system is the actual storage of data. Hence, it ultimately makes no difference whether the client sends the data to an automation component which then enters the data into the memory available to it, or whether the client sends the data to a special automation component which acts only or essentially as a memory in the automation system.

In this regard, for the purpose of coupling an automation component, subsequently referred to as a new component, to a distributed automation system having a plurality of automation components, at least one of which has access to configuration data, stored in the memory, having at least one configuration data record, the steps listed below are executed. In this context, configuration data may encompass all data which are required or useful for operating an automation component and/or the automation system overall. In this case, associated data are put together for easier access. Such a combination of associated data is subsequently referred to as a data record. In this context, a data record comprises, by way of example, an address which can be used to reach the respective automation component in the distributed automation system. Other parameters for this data record can relate to the type of access, e.g. to the transfer speed, data backup rush procedure, etc.

First, the new component sends a request relating to required configuration data to the automation system. As described above, the request is forwarded successively in the automation system. In this context, required configuration data can be, by way of example, a data record containing the data described above for the purpose of setting parameters for a communications link or else a manual or a detail from a manual which allows a user to set parameters for the respective automation component manually.

Next, every automation component which has received the request sends the new component a response containing detailed information relating to the configuration data to which the respective automation component has access. When this has ended, the new component has extensive information about the data stored in the automation system and/or about the services available in the automation system, data and services subsequently being referred to together as a configuration data record. Hence, the method is not limited to the coupling of new components, i.e. the components which were previously not operated in the automation system, but rather can be applied in the same manner to automation components which are already part of the automation system and for which a configuration data record in line with the above terminology is required which, up to the time at which this requirement arose, did not exist on the respective automation component or was not directly available thereto. The detailed information relating to the configuration data is in this case, by way of example, information regarding whether the configuration data record in question is a data record which contains data for setting parameters for a communications link, whether it is a data record containing data which can be displayed as a manual or part of a manual, relating to the language in which the manual is written, etc. In addition, a configuration data record can also contain data which represent a program with a particular functionality, such as an engineering system, a component of an engineering system, an editor, etc.

Finally, the component uses the detailed information to evaluate a configuration data record, requests said configuration data record from the corresponding automation component and stores the configuration data record, following receipt, in a configuration data memory.

The inventors also propose user-friendly replacement of one of the automation components in a distributed automation system. The automation component to be replaced is subsequently referred to as the old component, and the automation component which is intended to replace the old component is referred to as the new component. To replace the old component with the new component, the old component first stores its data, that is to say configuration data and/or program data and/or data representing states of a technical process controlled and/or monitored by the automation system, and/or descriptive data, such as technical documentation, manuals, comments and program data, etc., in a memory in the automation system in line with the method in accordance with what is described above.

The old component is then replaced with the new component. At the time at which it is first connected to the automation system, the new component has at least a functionality which allows it to set up a communicative connection to other automation components. The new component uses this functionality to search for and adopt the data stored by the old component.

The above procedure can be initiated by actuating a corresponding switching element, e.g. a pushbutton switch provided on the automation component. Actuation of the pushbutton switch signals to the respective automation component that it is just about to be removed from the automation system. Accordingly, this automation component initiates backup of the data stored on it in the distributed automation system in the manner described above. Completion of this step can be displayed on the automation component by an indicator element. A suitable indicator element is, by way of example, a two-color LED which uses a first color to signal that the data are currently being backed up, and changes color to signal that data backup is complete and the automation component can thus be removed from the automation system without the data contained in it being lost by the automation system. Similarly, by way of example, it is also possible to prevent the automation component from being removed from the automation system by an activated locking mechanism, e.g. an electromagnetic locking mechanism of the communications interface, until data backup has been successfully completed.

The retrieval of configuration data records stored in the automation system is facilitated if every configuration data record is provided with a configuration data record identifier which can be used to establish the suitability of the configuration data record for the new component. The configuration data record identifier can comprise, by way of example, a type descriptor for such automation components as can use the configuration data record. This is particularly advantageous for configuration data records which contain technical documentation, or manuals, or parts thereof. Since there are configuration data records of this type which are suitable for different automation components whose functionality is actually comparable in principle, e.g. automation components for analog input among which a first automation component is able to process analog data in the range from 0 to +5 V and a second automation component is able to process analog data in the range from 0 to 20 mA, it is beneficial if an appropriate request from such automation components returns detailed information which allows automation components of both the first and the second type to access these configuration data. It is likewise conceivable for the configuration data record identifier to contain a serial number or a similarly comparable unique reference for that automation component which has stored the data, so that, if the automation component is temporarily removed from the automation system and is connected to the automation system again at a later time, this automation component can again access precisely the data which were available to it at the time at which it was connected to the automation system the last time.

So that the new component can explicitly find the data which were stored by the old component before it was removed from the automation system, provision is advantageously made for a prescribed or generatable configuration identifier to be provided for every automation component, said configuration identifier being formed, by way of example, from particularly significant positions in the type descriptor for the automation component in question or being formed in relation to the, itself already unique, address of the old component in the automation system which is adopted by the new component, or by virtue of its being formed in relation to the geographical position of the old component in the automation system, which of course is also adopted by the new component. The suitability of a configuration data record for the new component can then be established by comparing that configuration identifier which is prescribed for the new component or which the new component generates itself with the configuration data record identifier corresponding to the configuration identifier which was added to the configuration data record by the old component. In this case, it would naturally not be necessary for the configuration identifier and the configuration data record identifier to be identical, but rather it would be sufficient for the configuration identifier and the configuration data record identifier to have an adequate match in terms of particular prescribed and prescribable characteristics.

Instead of the configuration data record identifier, it is additionally or alternatively possible for a descriptor to be stored together with the data which are to be stored, the descriptor advantageously permitting quick identification of the data. Another advantage is that the descriptor can be formed in relation to a position and/or an address of the client in the automation system, which means that it is also possible for data to be selected using the structure of the automation system or using the position of the respective automation component.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
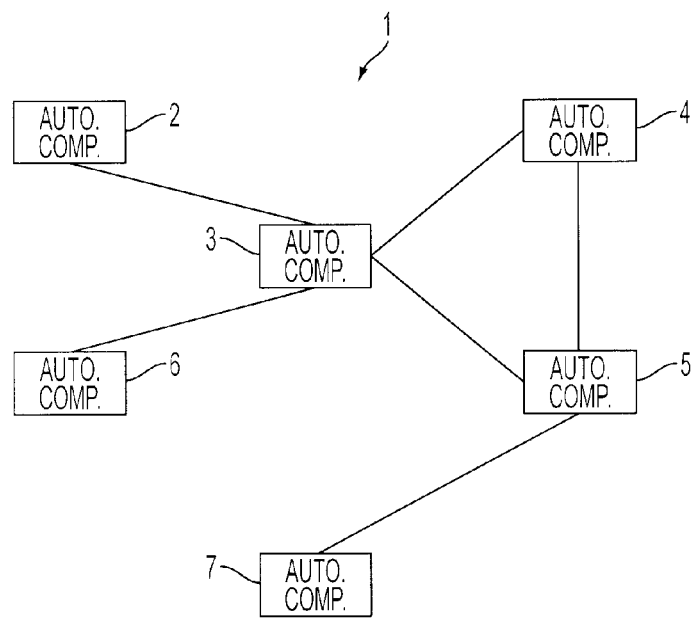
FIG. 1 shows an automation system.

Reference will now be made in detail to the preferred embodiments of the present invention, examples of which are illustrated in the accompanying drawings, wherein like reference numerals refer to like elements throughout.

FIG. 1 shows an automation system 1 having automation components 2, 3, 4, 5, 6, 7. The automation components 2 to 7 are communicatively connected to one another, as shown by the connecting lines. The communicative connection between the individual automation components 2 to 7 is, by way of example, a local bus system, such as a "field bus" or else entirely or partially connections on the "Internet" or on a local derivative of the Internet, an "intranet".

Figure 2:
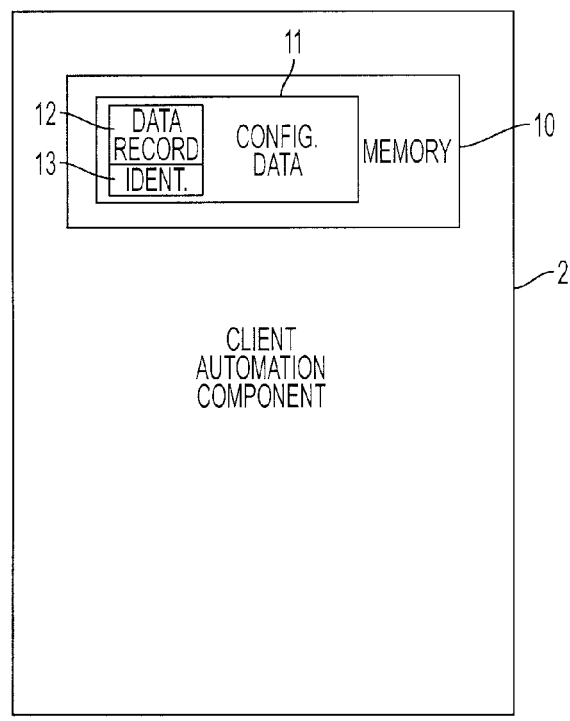
FIG. 2 shows an automation component.

FIG. 2 shows an automation component 2, subsequently also referred to as client 2, by way of example. Besides the usual functionality, the automation component 2 comprises at least one memory 10 storing data, particularly configuration data 11. The configuration data 11 comprise at least one configuration data record 12, such a configuration data record 12 being provided with a configuration data record identifier 13 or a descriptor 13.

Figure 3:
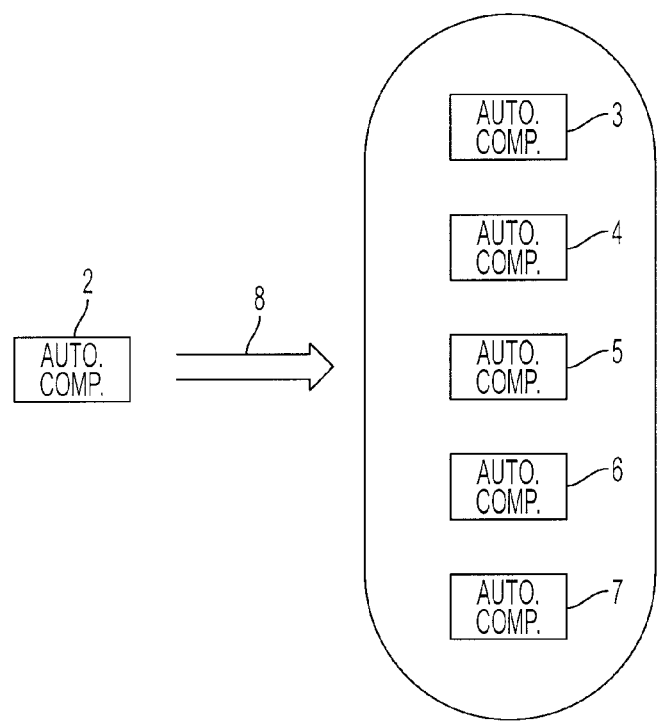
FIG. 3 shows a request from a client to the automation system.

FIG. 3 schematically shows a request 8 which the client 2 sends to the "remaining" automation system, formed from the automation components 3, 4, 5, 6, 7. This request is sent to the respective automation component 3 to 7 via the respective communication connections.

Figure 4:
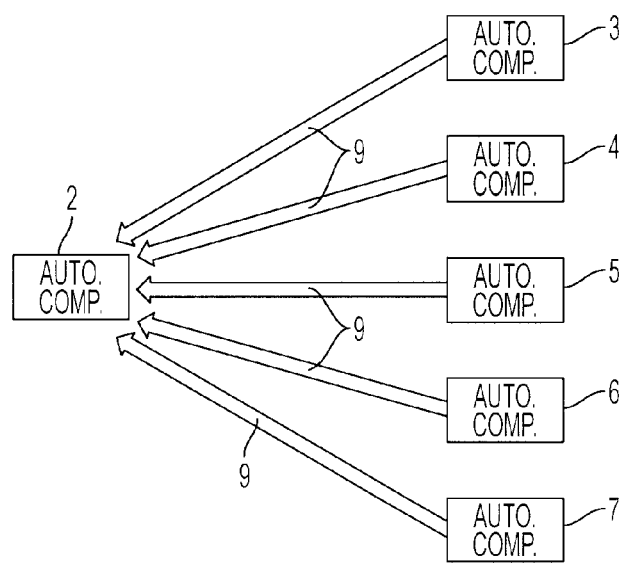
FIG. 4 shows a response from the automation components to the request, sent to the client.

FIG. 4 shows, by way of example, that every automation component 3 to 7 which has received the request 8 reacts to this request 8 with a response 9. If the request 8 was a request for a suitable storage location 10 for data 11 stored on the client 2, the response 9 contains detailed information relating to memory 10 available on the respective automation components 3 to 7. Using the respective responses 9, the client 2 selects that automation component 3 to 7 which is best suited to storing the data 11.

Figure 5:
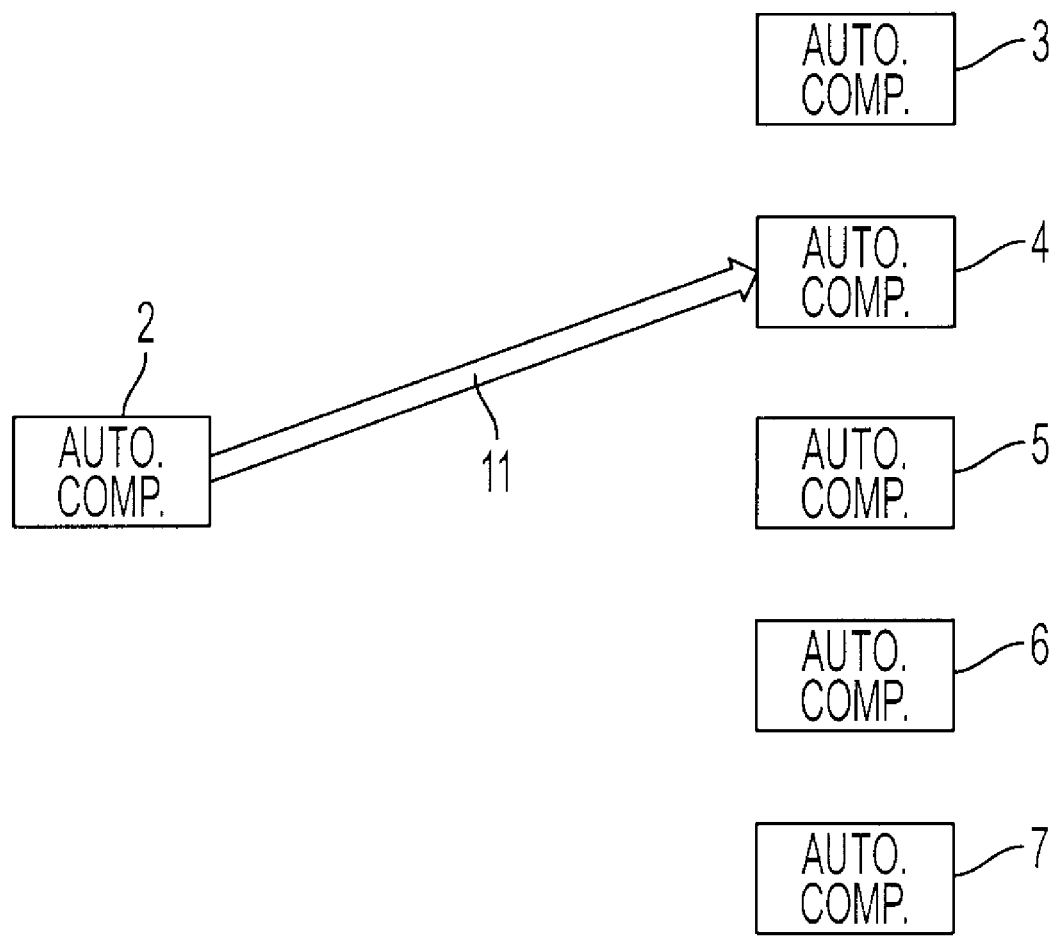
FIG. 5 shows the storage of data by the client in an automation component selected using the response.

In addition, FIG. 5 schematically shows transfer of the data 11 from the client 2 to a selected automation component 4 from the automation components 3 to 7.

The schematic structure shown in FIG. 2 for the automation component 2 also applies similarly to all other automation components 3 to 7. In this respect, storage of data 11 in another automation component 3 to 7 involves the data 11 being transferred from the memory 10 in the client 2 to the corresponding memory 10 in the target automation component.

The invention has been described in detail with particular reference to preferred embodiments thereof and examples, but it will be understood that variations and modifications can be effected within the spirit and scope of the invention.

The invention claimed is:

1. A method for coupling a new automation component to a distributed automation system having a plurality of automation components, at least one of which has access to configuration data stored in a memory, comprising:

sending a request from the new component to a plurality of the automation components other than the new automation component, the request relating to configuration data;

sending a response to the new automation component from each automation component receiving the request, the response containing information relating to any configuration data to which the respective automation component has access, selecting a chosen automation component at the new component, based on the information contained in the response, the chosen automation component having access to the configuration data;

requesting the configuration data from the chosen automation component; and receiving and storing the configuration data at the new automation component, in a configuration data memory.

2. A method for coupling a new automation component according to claim 1, wherein the chosen automation component is an old component, the old automation component sends a request to a plurality of the automation components other than the old automation component, each automation component has access to a memory, each automation component receiving the request sends a response to the old automation component, the response containing information relating to the memory to which the respective automation component has access, the old automation component selects a chosen memory, based on the information contained in the response, the old automation component sends data to the automation component having access to the chosen memory, for data storage in the chosen memory, and the old automation component is replaced with the new automation component.

3. The method as claimed in claim 2, wherein the configuration data has a configuration data record identifier, and the new automation component uses the configuration data record identifier to ascertain suitability of the configuration data.

4. The method as claimed in claim 3, wherein
the new automation component has a configuration identifier that describes a characteristic of the new automation component, and
suitability of the configuration data for the new automation component is ascertained by comparing the configuration identifier and the configuration data record identifier.

5. The method as claimed in claim 4, wherein
the data is stored in the chosen memory, and
the data is stored together with a descriptor.

6. The method as claimed in claim 5, wherein the descriptor refers to a location for the client automation component in the automation system.

7. The method as claimed in claim 2, wherein
the data is stored in the chosen memory, and
the data is stored together with a descriptor.

8. The method as claimed in claim 7, wherein the descriptor refers to a location for the client automation component in the automation system.

9. The method as claimed in claim 1, wherein
the configuration data has a configuration data record identifier, and
the new automation component uses the configuration data record identifier to ascertain suitability of the configuration data.

10. The method as claimed in claim 9, wherein
the new automation component has a configuration identifier that describes a characteristic of the new automation component, and
suitability of the configuration data for the new automation component is ascertained by comparing the configuration identifier and the configuration data record identifier.

* * * * *